(12) United States Patent
Deniau et al.

(10) Patent No.: US 7,439,982 B2
(45) Date of Patent: Oct. 21, 2008

(54) OPTIMIZED SCENE GRAPH CHANGE-BASED MIXED MEDIA RENDERING

(75) Inventors: Eric Deniau, La Baussaine (FR); Renaud Cazoulat, Rennes (FR)

(73) Assignee: Envivio, Inc., South San Francisco, CA (US)

(*) Notice: Subject to any disclaimer, the term of this patent is extended or adjusted under 35 U.S.C. 154(b) by 539 days.

(21) Appl. No.: 10/159,989

(22) Filed: May 31, 2002

(65) Prior Publication Data
US 2003/0222883 A1 Dec. 4, 2003

(51) Int. Cl.
*G09G 5/00* (2006.01)

(52) U.S. Cl. ......................... 345/581; 345/629

(58) Field of Classification Search ......... 345/419–427, 345/619–629, 581
See application file for complete search history.

(56) References Cited

U.S. PATENT DOCUMENTS

| | | | |
|---|---|---|---|
| 5,608,899 A | 3/1997 | Li et al. | |
| 5,734,888 A | 3/1998 | Li et al. | |
| 5,745,121 A * | 4/1998 | Politis | 345/619 |
| 6,266,053 B1 * | 7/2001 | French et al. | 715/500.1 |
| 6,373,489 B1 * | 4/2002 | Lu et al. | 345/428 |
| 6,445,740 B1 * | 9/2002 | Mallart et al. | 375/240.08 |
| 6,463,431 B1 | 10/2002 | Schmitt | |
| 6,470,383 B1 | 10/2002 | Leshem et al. | |
| 6,487,565 B1 * | 11/2002 | Schechter et al. | 715/500.1 |
| 6,512,522 B1 * | 1/2003 | Miller et al. | 345/474 |
| 6,606,306 B1 | 8/2003 | Lin et al. | |
| 6,741,242 B1 * | 5/2004 | Itoh et al. | 345/419 |
| 2002/0015039 A1 * | 2/2002 | Moore | 345/421 |
| 2002/0032697 A1 * | 3/2002 | French et al. | 707/500.1 |
| 2002/0120753 A1 * | 8/2002 | Levanon et al. | 709/228 |
| 2002/0188959 A1 | 12/2002 | Piotrowski | |
| 2003/0011637 A1 * | 1/2003 | Boudier | 345/771 |
| 2003/0028901 A1 * | 2/2003 | Shae et al. | 725/146 |
| 2003/0110297 A1 * | 6/2003 | Tabatabai et al. | 709/246 |
| 2003/0222883 A1 | 12/2003 | Deniau | |
| 2004/0024898 A1 * | 2/2004 | Wan | 709/231 |
| 2004/0054965 A1 * | 3/2004 | Haskell et al. | 715/501.1 |
| 2004/0110490 A1 * | 6/2004 | Steele et al. | 455/412.1 |
| 2004/0125103 A1 * | 7/2004 | Kaufman et al. | 345/419 |
| 2005/0122341 A1 * | 6/2005 | MacInnis et al. | 345/558 |

FOREIGN PATENT DOCUMENTS

WO     WO 03/102874 A1     12/2003

OTHER PUBLICATIONS

SVG 1.0 specification, http://www.w3.org/TR/2001/PR-SVG-20010719, sections.*

* cited by examiner

*Primary Examiner*—Ryan R Yang
(74) *Attorney, Agent, or Firm*—Swernofsky Law Group PC (57) ABSTRACT

A method and system for rendering mixed media at a presentation workstation in response to a mixed media stream, in which the amount of computation is minimized. A tree structure includes nodes, each of which might point to sub-trees, and each of which designates a geometric object, a transformation to be applied to a geometric object, or a time-varying presentation. A scene includes nodes for each element in the scene. Depending from these would be nodes describing aspects of those elements, such as their texture and shape. A root node join the descriptions of each of the objects in the scene. Optimizing the amount of computation includes selecting nodes in the tree and calculating how to render each sub-tree. When possible, rendering information is calculated for only those portions of objects that will ultimately be shown to the user.

27 Claims, 4 Drawing Sheets

OPTIMIZED SCENE GRAPH CHANGE-BASED MIXED MEDIA RENDERING

BACKGROUND OF THE INVENTION

1. Field of the Invention

The invention relates to mixed media rendering.

2. Related Art

It is often desirable to send more than one type of media (known as "mixed media") from a content server (or "originating server") to a client device (or "terminal") for presentation to a user. Mixed media can include: video, still images, vector graphics, bit maps, sounds, and other information for presentation to the user. MPEG-4 is one known method for encoding such mixed media scenes. MPEG-4 has a graph data structure, including the nodes of the graph, and links or relationships between pairs of those nodes. Information in this graph data structure describes the constituent elements of the scene to be presented.

One known problem with using MPEG-4 is that graphical display of different content and different media types (collectively known as objects) can raise significant performance issues. For example, when two objects or parts of objects occupy approximately the same spatial location in a MPEG-4 presentation, it may be unclear which object is to be displayed to a viewer. Similar problems exist when one of the objects is transparent or translucent (thus requiring that some portion of the both images must still be shown). An MPEG-4 display may include a large number of such objects, each requiring significant computation for correct presentation.

Another known problem is that the frame rate (that is, the number of frames that are displayed per second) is inversely proportional to the complexity of the graphical display. It is difficult to maintain a sufficiently fast frame rate when computing a complex stream without compromising the quality of the display.

SUMMARY OF THE INVENTION

The invention provides a method and system for rendering mixed media at a terminal in response to a mixed media stream (such as an MPEG-4 stream) in which the amount of computation is minimized while the entire mixed media presentation is accurately rendered and presented.

In one aspect of the invention, two different tree structures are used to represent an object in a scene. The first of these tree structures is called a scene graph. The scene graph includes a root node and a set of dependent nodes. The root node includes a geometric shape, such as a rectangle, that corresponds to an object in the presentation. The dependent nodes can designate various characteristics of the object such as color, transparency, texture, rotation, volume, size and other similar features. These nodes provide placeholders for values associated with these various characteristics and shapes. A second tree structure, called a presenter graph is related to the first tree structure. Similar to the scene graph, the presenter graph includes a root node and a set of dependent nodes. As the presenter graph is traversed, the instructions for rendering an object in a scene are obtained using the values included in the scene graph. There is a one-to-one correspondence between scene graphs and presenter graphs. Scene graphs include information such as the static values that are used to describe the elements of each scene. Presenter graphs include instructions for rendering dynamic changes in scenes efficiently using values already included in (or computed from) those scene graphs.

In another aspect of the invention, a join node couples the various tree structures and provides information about how the objects are integrated into a single scene. Subtrees can also depend from the nodes in a presenter graph and from the nodes of a scene graph. Multiple scene graphs and multiple presenter graphs can be used in the rendering of an entire multi-media presentation.

In a second aspect of the invention, a processor at the terminal selects nodes in the tree and calculates whether to render each node in the tree and if so, how to render that node. Similar calculations are performed for subtrees that may depend from each node. When possible, the processor calculates rendering information for only those portions of objects that will ultimately be shown to the user.

This technique results in significant savings in computational resources used to encode and render an object. For example, this technique results in a substantial savings of resources when encoding a presentation that includes several small objects moving on top of large static objects (such as birds flying across an unchanging sky) because it is only necessary to re-render the changing portions of the drawings. In a second example, there is also large saving of resources when zooming in or enlarging a single object. In this second example, it is not necessary to redraw all of the objects that are hidden behind the enlarged object. Similar savings can also be obtained when determining how to render sound such that it may not be necessary to compute information for sounds that are drowned out or otherwise not heard by a listener.

DETAILED DESCRIPTION OF THE PREFERRED EMBODIMENT

The following related applications and patent are/were co-pending with and have common inventive entities and a common assignee as this application: U.S. patent application Ser. No. 10/222,952, U.S. Pat. No. 10/403,835, and U.S. Pat. No. 6,711,300.

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The following terms relate or refer to aspects of the invention or its embodiments.

Binary scene decoder—as used herein, the term "binary scene decoder" includes a device or computer-executable instructions for (1) creating a scene graph and presenter graph, and (2) computing how to display information to a viewer. The binary scene decoder can be included in a client side terminal.

Scene graph—as used herein, the term "scene graph" is a tree structure that includes a set of nodes that are placeholders for information regarding the display of an object in a mixed media scene. An exemplary scene graph may include a placeholder for a rectangular area corresponding to the object and a set of placeholders for various properties associated with that object, such as color, transparency and texture. Taken by itself, the scene graph is static and acts as a container for information. Although displayed as a tree, the scene graph describes a data structure.

Presenter graph—as used herein, the term "presenter graph" is a tree structure that includes data relating to the display of an object in a mixed media scene. An exemplary presenter graph may include information relating to various properties of a media object, such as color, transparency and texture, as well as the information needed to compute any drawing operations relating to those properties. Although displayed as a tree, the presenter graph describes a data structure for processing information.

terminal—as used herein, the term "terminal" includes a client device that is used to receive and decode one or more media streams for display to a user. The terminal may include a computing device coupled to a network, a television with a set-top box coupled to a network or other devices.

MPEG-4—as used herein, the term "MPEG-4" refers to a technique for encoding different forms of audio-visual data, called audio-visual objects. MPEG-4 involves defining these objects, describing their spatial and temporal relationship to each other and encoding them.

occlude—as used herein, the term "occlude" refers to the movement of one object included in an MPEG-4 scene in relation to another object such that one of the objects is completely or partially obscured.

scene—as used herein, the term "scene" refers to a set of objects and other elements (for example, sprites) that are present at any one point in time during a multi-media display.

translucent or transparent—as used here, the terms "translucent" and "transparent" refer to properties of an object in a scene. If an object is translucent or transparent, it is necessary to render both the object and the objects behind it.

The scope and spirit of the invention is not limited to any of these definitions, or to specific examples mentioned therein, but is intended to include the most general concepts embodied by these and other terms.

System Elements

Figure 1:
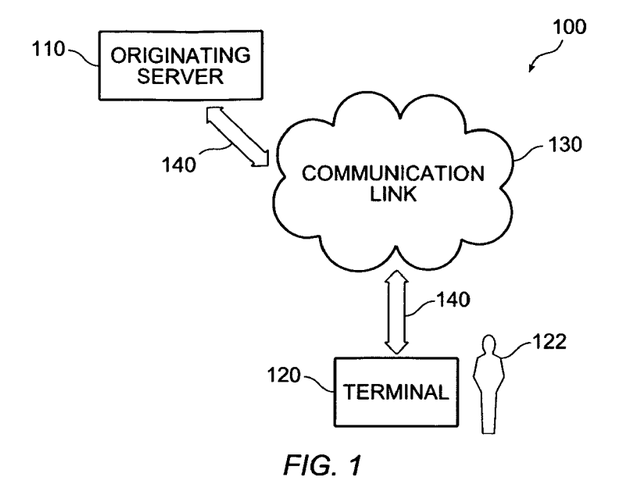
FIG. 1 shows a high level view block diagram of a system including mixed media rendering.

FIG. 1 shows a high level view block diagram of a system including mixed media rendering.

A system 100 includes an originating server 110, a terminal 120, a communication link 130 and a media stream 140.

The originating server 110 includes a processor, a memory and sufficient server software so as to transmit a media stream 140 (for example, an MPEG-4 presentation) to a terminal 120. In different embodiments, the originating server 110 can multicast the media stream 140 to many terminals 120 or may unicast the media stream 140 to a single terminal 120. In one embodiment, all of the different aspects of a presentation are sent from a single originating server 110 to a terminal 120. In other embodiments, several originating servers 110 may be used to transmit different forms of media or different content to the terminal 120 where the media is combined to form a single presentation or scene in a presentation.

In another embodiment, the media stream 140 originates from a local file on the client side. In such embodiments, there is no need for an originating server 110.

The terminal 120 (shown in greater detail in FIG. 2) is under the control of a user 122. The terminal 120 preferably includes a buffer for storing media and sufficient circuitry or software for presenting the media stream to a user 122. The terminal 120 receives the media stream 140 from an originating server 110, buffers and decodes that stream 140, and presents it to the user 122. In one embodiment, the terminal 120 may receive different media streams 140 from different originating servers 110. The different media streams 140 are integrated at the terminal 120 so as to comprise a single presentation to be viewed by a user 122. In some embodiments, the media is stored locally on the client side. In such embodiments, the terminal 120 does not receive the media stream 140 from the originating server 110, but rather from a local source, such as a file stored on a disk or in the memory on the user's computer.

Various embodiments of the terminal 120 include a computer and monitor, a television and set-top box, and other similar devices used to process information and present it to a user.

The communication link 130 can include a computer network, such as an Internet, intranet, extranet or a virtual private network. In other embodiments, the communication link 130 can include a direct communication line, a switched network such as a telephone network, a wireless network, a form of packet transmission or some combination thereof. All variations of communication links noted herein are also known in the art of computer communication. In one embodiment, the originating server 110 and the terminal 120 are coupled by the communication link 130.

The media stream 140 may include various forms of mixed media, preferably MPEG-4. The scenes in the media stream 140 that are sent from the originating server 110 or local memory are encoded in a binary format that is subsequently decoded at the terminal 120. Different types of media that may be included in a media stream 140 include audio, video, and vector graphics.

Figure 2:
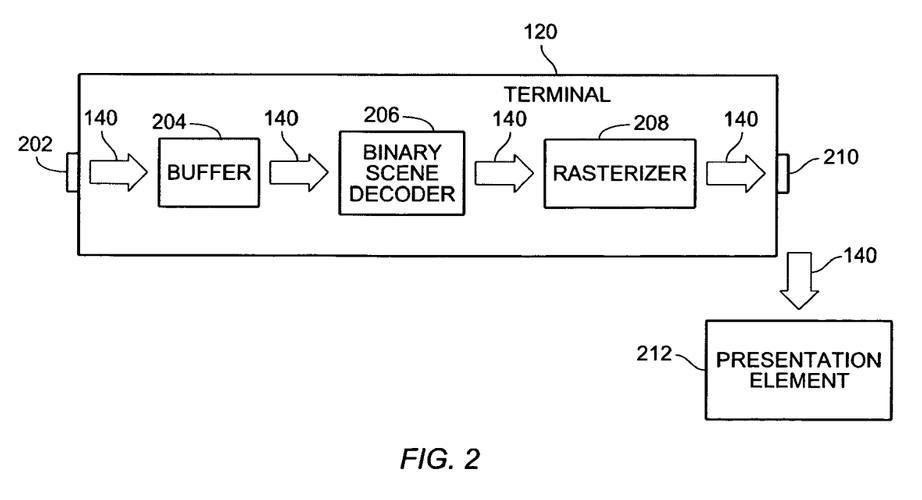
FIG. 2 shows a block diagram of a terminal that is used in a system for mixed media rendering.

FIG. 2 shows a block diagram of a terminal that is used in a system including mixed media rendering.

The terminal 120 includes input port 202, a buffer 204, a binary scene decoder 206, a rasterizer 208, an output port 210. In one embodiment, the terminal 120 is coupled to a presentation element 212. In various embodiments, the elements of the terminal 120 and presentation element 212 may be included in a set top box and television set, a computer and computer monitor or other devices.

The input port 202 includes a port for receiving a digital media stream 140. The media stream 140 is received at the input port 202 and buffered in the buffer 204 until such time that it is decoded by the binary scene decoder 206.

The binary scene decoder 206 includes a processor and sufficient memory for storing instructions relating to generating a scene graph and a presenter graph and sending information relating to those graphs to the rasterizer 208. Both the scene graph and presenter graph are described in detail in FIG. 3. However, in brief, the scene graph is organized as a tree of placeholders for each object in a scene. The presenter graph includes information relating to the properties associated with the scene graph and how they relate to each other. The binary scene decoder 206 also includes a set of directions for rendering information described by the presenter graph using the smallest number of drawing operations.

The rasterizer 208 includes a processor and a computer program for generating a bit map and a set of pixels that are responsive to information from the binary scene decoder 206. In one embodiment, the drawing process implemented by the rasterizer 208 is optimized for rendering MPEG4 data; however, this process can be optimized for rendering other information such as a presentations that are encoded using MPEG-1, MPEG-2, H.261, H.263, ITU-T or other similar encoding techniques. Upon generating a set of pixels, the rasterizer 208 sends the set of pixels to the output port 210 for presentation to a user 122 at a presentation element 212.

The presentation element 212 includes an element such as a television screen, computer monitor or other viewing platform for presenting the set of pixels generated by the rasterizer 208 to a user 122.

Figure 3:
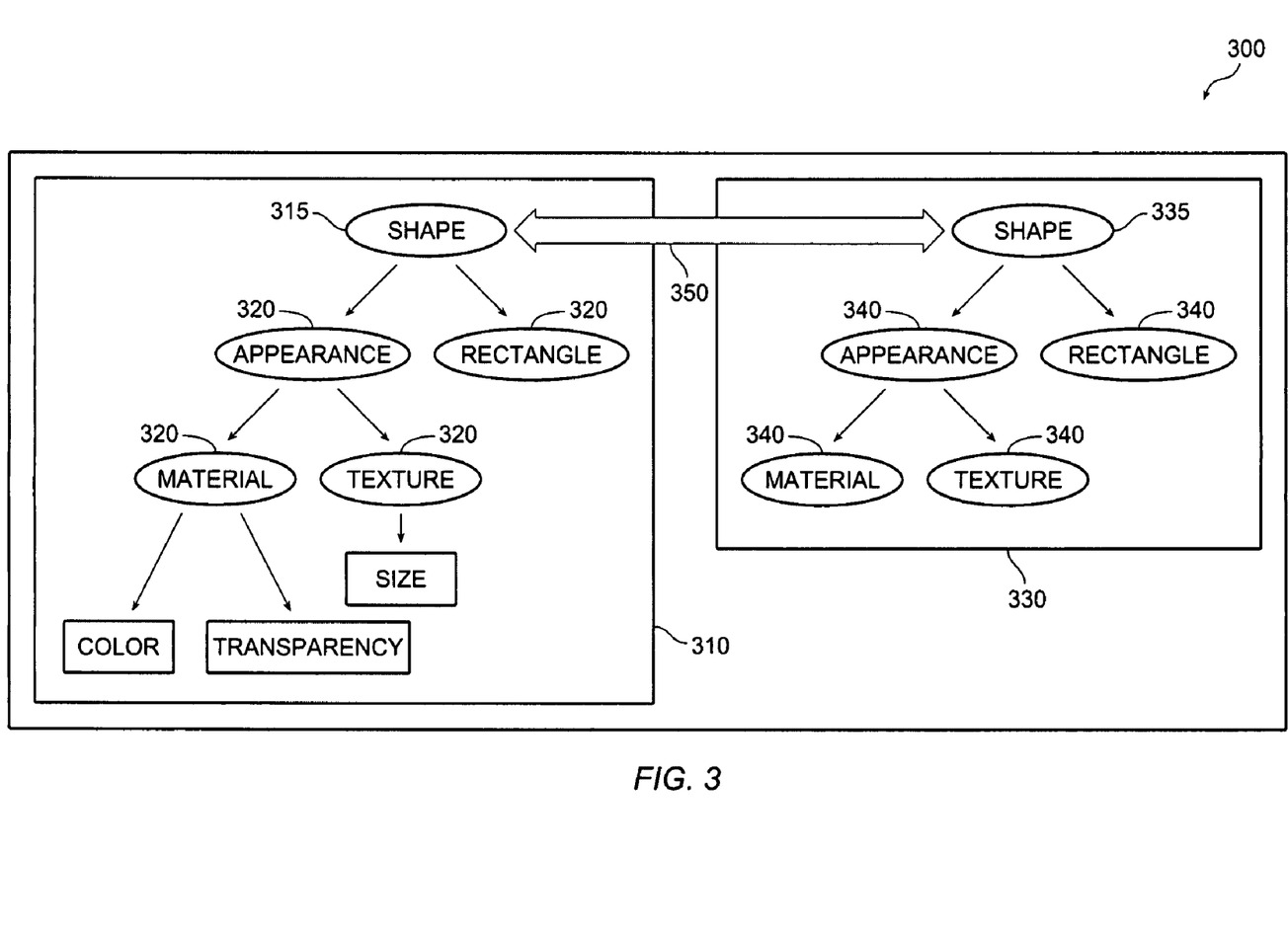
FIG. 3 shows a graph structure that is used in a system for mixed media rendering.

FIG. 3 shows graph structures that are used in a system for mixed media rendering. Although presented herein as a tree, the graph structures represent data structures for processing instructions.

As described above, the binary scene decoder 206 transforms each object in a scene in the media stream 140 into a pair of graphs 300, including a scene graph 310, a presenter graph 330 and a set of links 350 between the scene graph 310 and the presenter graph 330.

The scene graph 310 includes a scene graph root node 315 and a set of scene graph dependent nodes 320. The root node 315 describes a shape (such as a rectangle or square) that is associated with the object. The relationship between this shape and the object is further described in FIG. 4. The scene graph dependent nodes 320 each describe a property associated with the object. These properties can include rotation, transparency, color, volume, texture, size and other similar characteristics. One of the scene graph root nodes 315 may couple all of the scene graph dependent nodes 320 associated with a scene. Such scene graph root nodes 315 are also known as join nodes.

The information stored in the scene graph 310 provides a snapshot of the current state of a scene, including a set of values related to the particular node (for example, values associated with transparency or values associated with color). However, neither the scene graph root node 315 nor the scene graph dependent nodes 320 include any intelligence regarding the rendering of the objects. The information included in the scene graph 310 reflects a static representation of the scene because it does not include any intelligence relating to how those values may change over time or in response to interactions with a user 122.

The presenter graph 330 includes a presenter graph root node 335 and a set of presenter graph dependent nodes 340 arranged as a DAG (direct acyclic graph). The presenter graph root node 335 describes a shape (such as a rectangle or square) that is associated with the object. Similar to the presenter graph root node 315, a presenter graph root node 335 may couple all of the presenter graph dependent nodes 340 associated with a scene. Such presenter graph root nodes 335 are also known as join nodes.

The presenter graph nodes 340 each correspond to a property associated with the object. These properties can include rotation, transparency, color, volume, texture, size and other similar characteristics. However, unlike the scene graph 310 which includes a set of values related to each property, the presenter graph root node 335 and presenter graph dependent nodes 340 in a presenter graph 330 include additional intelligence for rendering each property associated with the node. In addition to knowing how to render that property, each dependent node 340 in the presenter graph 330 also knows how to manage interactions from a user 122 (for example, displaying a flash animation in response to user input). Lastly, the presenter graph 330 also includes information regarding which objects have been modified and instructions for generating the minimum number of drawing operations for the rasterizer 208.

Interactivity, animation and rendering are efficiently achieved by traversing the presenter graph 330 to obtain intelligence with respect to a value associated with the scene graph 310. As described in further detail in FIG. 4, two traversals of the presenter graph are required. The first traversal is directed at determining which objects need to be updated and the order in which the objects should be updated. The second traversal updates those objects that need to be updated. Objects or parts of objects that should not be visible to the user are not updated.

A set of links 150 between nodes in the scene graph 310 and the nodes in the presenter graph 330 create an association between various nodes such that there is a one-to-one relationship between individual nodes in the scene graph 310 and individual nodes in the presenter graph 330. Thus, when a value associated with a node in the scene graph 310 is modified, information regarding the change is sent over the link 150 to the corresponding node field in the presenter graph 330 so that the corresponding node is modified as well. For example, if a link 150 couples a scene graph node 315 is in the scene graph 310 with a presenter graph node 340 in the presenter graph 330 and there is a change in the color value associated with the scene graph node 315, then there will be a corresponding change regarding the instructions for rendering that color in the presenter graph node 340. Similar modifications can be made for other characteristics associated with objects such as rotation, transparency, color, volume, texture and others.

Method of Operation

Figure 4:
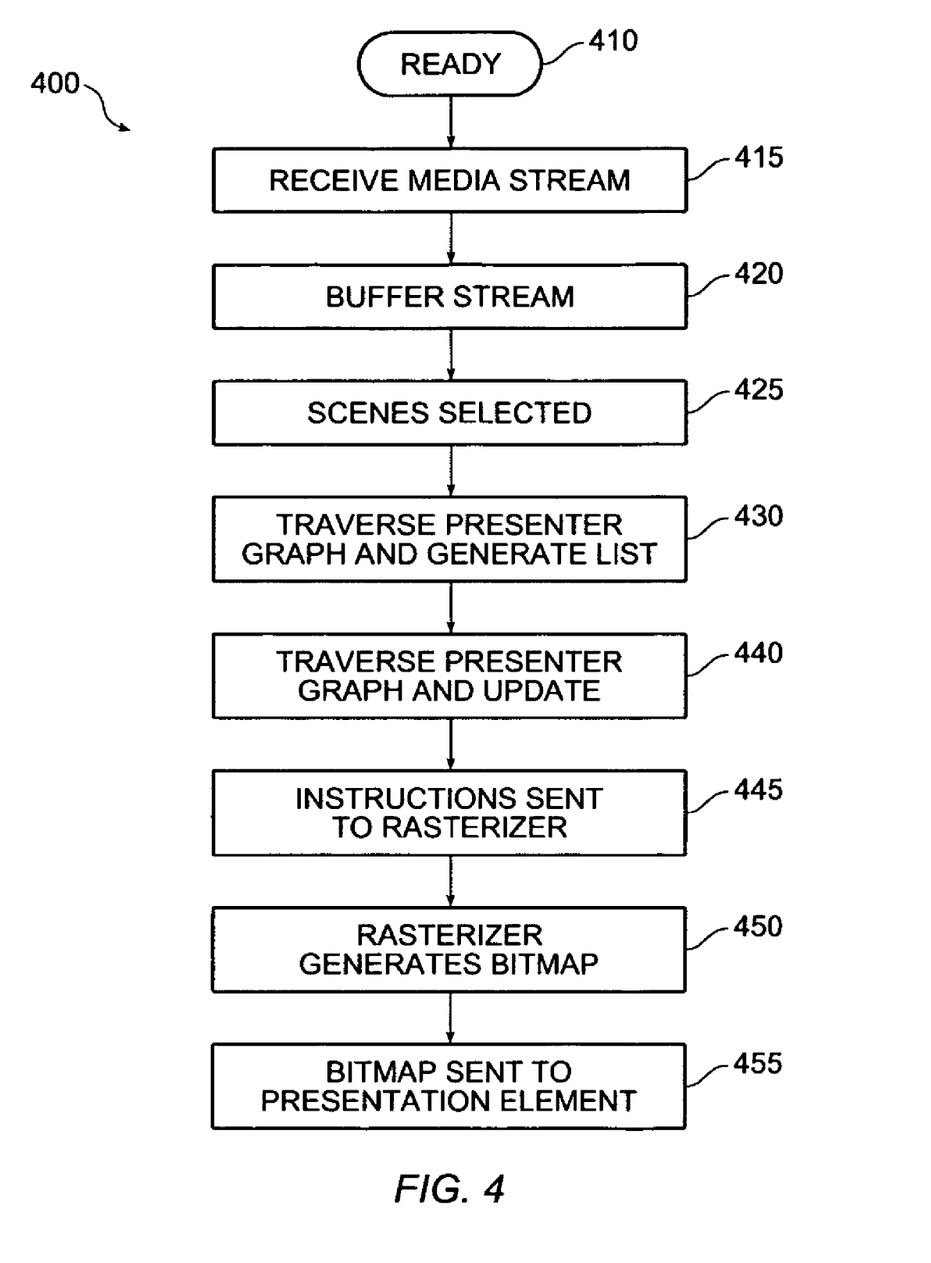
FIG. 4 shows a process flow diagram of a method including mixed media rendering.

FIG. 4 shows a process flow diagram of a method including mixed media rendering.

A method 400 includes a set of flow points and a set of steps. In one embodiment, the system 100 performs the method 400, although the method 400 can be performed by other systems. Although the method 400 is described serially, the steps of the method 400 can be performed by separate elements in conjunction or in parallel, whether asynchronously, in a pipelined manner, or otherwise. There is no particular requirement that the method 400 be performed in the same order in which this description lists the steps, except where so indicated.

At a flow point 410, the system 100 is ready to begin performing a method 400.

In a step 415, a mixed media stream 140 is received from the originating server 110 or the local memory by the imput port 202 on the terminal 120. This mixed media stream 140 preferably includes an MPEG-4 presentation, but may also include a presentation that is encoded using MPEG-1, MPEG-2, H.261, H.263,ITU-T or similar encoding techniques.

In a step 420, the media stream 140 is buffered in the buffer 204 until such time that the binary scene decoder 206 is ready to decode it.

In a step 425, the binary scene decoder 206 selects sequential scenes in the media stream 140 to encode. The values of the objects in the scene are identified and a scene graph 310 and corresponding presenter graph 330 are generated.

In a step 430, the presenter graph 330 is traversed. The process of traversing (also known as processing) the presenter graph 330 involves identifying presenter graph root nodes 335 and presenter graph dependent nodes 340 that are in need of updating. For example, if the size of an object changes from one scene to another, then the size of a rectangle corresponding to that object will also change. Information included in the presenter graph 330 that pertains to that rectangle will need to be updated to reflect these changes. Generally, an geometric shape associated with an object needs to be updated if the object changed (for example, changed in size, color, rotation, volume or other p+roperties) or because the object has become are partially occluded, completely occluded, or exposed by another object. As the presenter graph 330 is traversed, a list is generated of the geometric shapes and the dependent nodes associated with those shapes that need to be updated.

The traversal of the presenter graph 430 is performed depth first or substantially depth first. In this context, a traversal is considered substantially depth first if more than half of the traversal occurs depth first. The order of rectangles on the list of rectangles that need to be updated reflects the order in which they will be updated. For example, a scene comprised of a background and three objects may be designated as 0 (for the background) and 01, 02 and 03. These objects correspond respectively to different rectangles in the nodes in the tree, designated 0, R1, R2 and R3. As the order of rectangles corresponds to their relative location in the presenter graph 330, R2 is located deeper in the tree than R1. Similarly, R3 is located deeper in the tree than R2. These locations correspond to the actual spatial location of the objects. If an object is associated with a node that is deeper in the tree, that object is presented on top of or in front of other objects associated with nodes that are not as deep in the tree. If an object is not as deep in the tree, it may not need rendering because it may be partially or totally occluded by another object.

In a step 440, the presenter graph 330 is traversed a second time. During this second traversal, the nodes that require updating are updated in the order on the list. This prevents objects from being unnecessarily redisplayed. If the object is completely obscured, it will not be updated. This second traversal is performed depth first or substantially depth first. A traversal is performed substantially depth first if more than half the traversal is performed depth first.

In a step 445, the instructions from the presenter graph 330 for updating objects are sent to the rasterizer 208.

In a step 450, the rasterizer 208 generates a bit map that corresponds to the updated information.

In a step 455, the updated bit map is sent to the presentation element 212 for presentation to a user 122.

The method 400 may be performed for every scene in a mixed media presentation so as to efficiently render the media stream 140 for display to a user 122.

Figure 5:
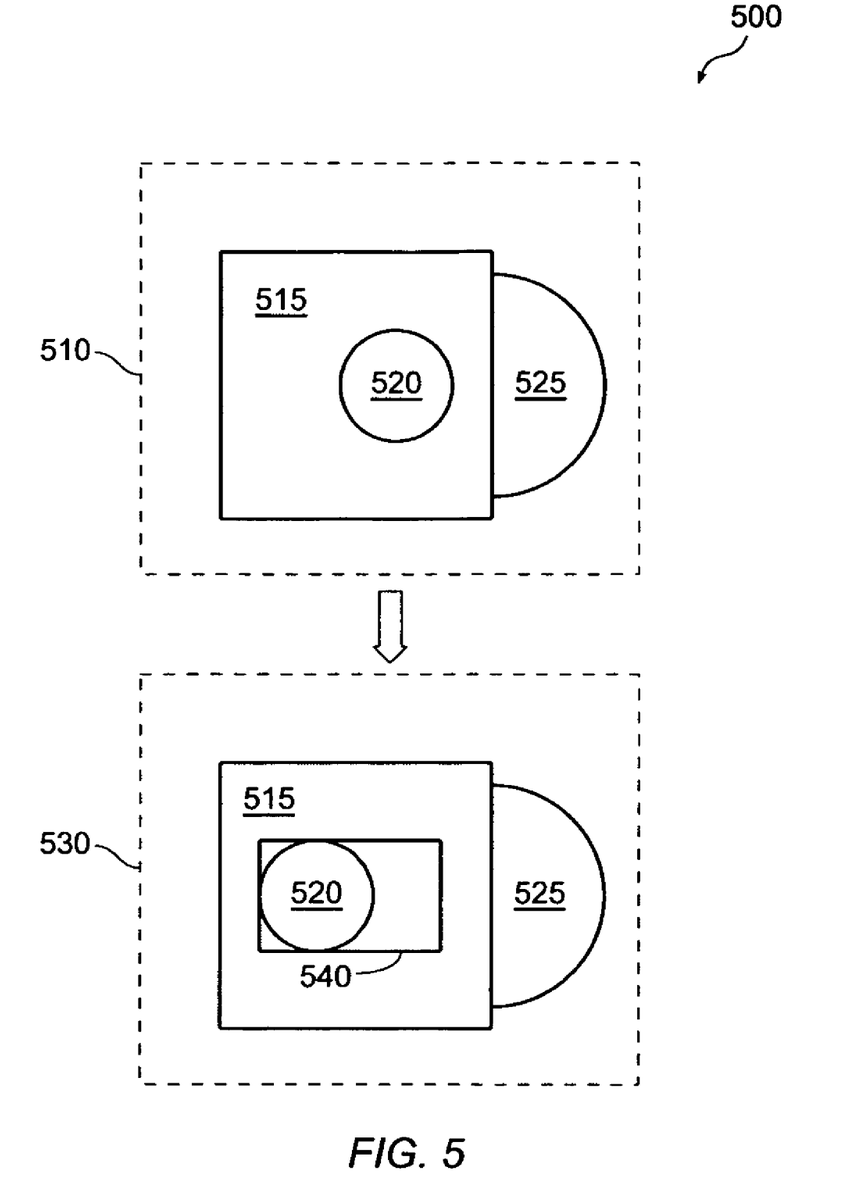
FIG. 5 is a block diagram of an exemplary sequential scene in a mixed media presentation that shows how a system for rendering mixed media minimizes the amount of computation required to render a scene.

FIG. 5 is a block diagram of an exemplary sequential scene in a mixed media presentation that shows how a system for rendering mixed media minimizes the amount of computation required to render a scene.

The exemplary sequential scene 500 is comprised of a first scene 510 and a second scene 530. The second scene 530 occurs at a point in time just after the first scene 510. A mixed media presentation may include many scenes, which are comprised of many objects.

First scene 510 and second scene 530 both include a square 515, a small circle 520 and a large circle 525. The difference between the first scene 510 and the second scene 530 is that the small circle 520 has moved from the right of the square 515 to the left of the square 515. A rectangle 540 is used to define the area where this movement takes place. The rectangle 540 defines the region that needs to be updated.

A scene graph 310 is used to provide a placeholder for the values associated with the square 515, the small circle 520 and the large circle 525. A presenter graph 330 indicates the changes between scene 510 and scene 530. By traversing the presenter graph 330 twice as shown in FIG. 4, a list of the elements that need updating is generated and updates are performed for only those elements that need updating. For example, it is only necessary to update the area bounded by rectangle 540. It is not necessary to update the parts of the 515 that are not bounded by the rectangle 540 or the large circle 525.

Alternative Embodiments

Although preferred embodiments are disclosed herein, many variations are possible which remain within the concept, scope, and spirit of the invention. These variations would become clear to those skilled in the art after perusal of this application.

The invention claimed is:

1. A computer-implemented method comprising the steps of:

receiving a media stream for a mixed media scene with one or more objects;

generating a scene graph including root nodes and a set of dependent nodes wherein the scene graph root node describes a shape associated with an object wherein the scene graph dependent nodes each describe a property associated with the object;

said nodes describing said scene responsive to said media_stream, said scene graph providing a static representation of said scene generating a presenter graph including a root node and a set of dependent nodes arranged as a direct acyclic graph (DAG)

wherein the presenter graph nodes include additional intelligence for rendering each property associated with the node said presenter graph nodes describing said scene responsive to said scene graph, said presenter graph linked to said scene graph, providing intelligence for rendering said objects, and providing knowledge about how to manage interaction of a user with said objects;

wherein said presenter graph includes information regarding which of said objects have been modified, and providing instructions for generating drawing operations for a rasterizer;

processing said presenter graph a first time to generate a list of said nodes of said presenter graph that need updating;

processing said presenter graph a second time responsive to said list so as to update said nodes of said presenter graph that need updating; and rendering and displaying said scene responsive to the step of processing said presenter graph said second time;

wherein said nodes of said presenter graph create a one-to-one relationship with individual nodes in said scene graph;

wherein a change to one of said nodes of said scene graph is transmitted over a link to a corresponding one of said nodes of said presenter graph.

2. A computer-implemented method as in claim 1, wherein each of said nodes of said scene graph is linked to at least one of said nodes of said presenter graph.

3. A computer-implemented method as in claim 1, wherein processing said presenter graph said first time is performed such that nodes for those of said objects that do not need to be updated are not included in said list, thereby reducing an amount of processing said presenter graph said second time.

4. A computer-implemented method as in claim 1, wherein processing said presenter graph said first time and processing said presenter graph said second time are performed depth first.

5. A computer-implemented method as in claim 1, wherein said media_stream includes at least one of the following: MPEG-1, MPEG-2, H.261, H.263, or MPEG-4.

6. A computer-implemented method as in claim 1, wherein said scene graph, said presenter graph, or both said scene graph and said presenter graph include values associated with at least one of the following aspects of said objects: size, color, position, angular position, texture, transparency and shape.

7. A computer-implemented method as in claim 6, wherein said aspects are used to animate said object.

8. A computer-implemented method as in claim 1, wherein said presenter graph includes information about rendering changes in values associated with at least one of the following aspects of said object: size, color, position, rotation, texture, transparency, and shape.

9. A computer-implemented method as in claim 8, wherein said changes are responsive to interaction of said user with said objects.

10. An apparatus comprising:
a processor; and
memory storing data and instructions executable by the processor, the instructions including at least steps of:
receiving a media_stream for a mixed media scene with one or more objects;
generating a scene graph including root nodes and a set of dependent nodes;
wherein the scene graph root node describes a shape associated with an object;
wherein the scene graph dependent nodes each describe a property associated with the object;
said nodes describing said scene responsive to said media_stream, said scene graph providing a static representation of said scene;
generating a presenter graph including a root node and a set of dependent nodes arranged as a direct acyclic graph (DAG);
wherein the presenter graph nodes include additional intelligence for rendering each property associated with the node;
said presenter graph nodes describing said scene responsive to said scene graph, said presenter graph linked to said scene graph, providing intelligence for rendering said objects, and providing knowledge about how to manage interaction of a user with said objects;
wherein said presenter graph includes information regarding which of said objects have been modified, and providing instructions for generating drawing operations for a rasterizer;
processing said presenter graph a first time to generate a list of said nodes of said presenter graph that need updating;
processing said presenter graph a second time responsive to said list so as to update said nodes of said presenter graph that need updating; and
rendering and displaying said scene responsive to the step of processing said presenter graph said second time;
wherein said nodes of said presenter graph create a one-to-one relationship with individual nodes in said scene graph;
wherein a change to one of said nodes of said scene graph is transmitted over a link to a corresponding one of said nodes of said presenter graph.

11. An apparatus as in claim 10, wherein each of said nodes of said scene graph is linked to at least one of said nodes of said presenter graph.

12. An apparatus as in claim 10, wherein processing said presenter graph said first time is performed such that nodes for those of said objects that do not need to be updated are not included in said list, thereby reducing an amount of processing said presenter graph said second time.

13. An apparatus as in claim 10, wherein processing said presenter graph said first time and processing said presenter graph said second time are performed depth first.

14. An apparatus as in claim 10, wherein said media_stream includes at least one of the following: MPEG-1, MPEG-2, H.261, H.263, or MPEG-4.

15. An apparatus as in claim 10, wherein said scene graph, said presenter graph, or both said scene graph and said presenter graph include values associated with at least one of the following aspects of said objects: size, color, position, angular position, texture, transparency and shape.

16. An apparatus as in claim 15, wherein said aspects are used to animate said object.

17. An apparatus as in claim 10, wherein said presenter graph includes information about rendering changes in values associated with at least one of the following aspects of said object: size, color, position, rotation, texture, transparency, and shape.

18. An apparatus as in claim 17, wherein said changes are responsive to interaction of said user with said objects.

19. A memory storing information including instructions executable by a processor to perform a method, the instructions comprising the steps of:
receiving a media_stream for a mixed media scene with one or more objects;
generating a scene graph including root nodes and a set of dependent nodes;
wherein the scene graph root node describes a shape associated with an object;
wherein the scene graph dependent nodes each describe a property associated with the object;
said nodes describing said scene responsive to said media_stream, said scene graph providing a static representation of said scene;
generating a presenter graph including a root node and a set of dependent nodes arranged as a direct acyclic graph (DAG);
wherein the presenter graph nodes include additional intelligence for rendering each property associated with the node;
said presenter graph nodes describing said scene responsive to said scene graph, said presenter graph linked to said scene graph, providing intelligence for rendering said objects, providing knowledge about how to manage interaction of a user with said objects, providing information regarding which of said objects have been modified, and providing instructions for generating drawing operations for a rasterizer;
processing said presenter graph a first time to generate a list of said nodes of said presenter graph that need updating;
processing said presenter graph a second time responsive to said list so as to update said nodes of said presenter graph that need updating; and
rendering and displaying said scene responsive to the step of processing said presenter graph said second time;

wherein said nodes of said presenter graph create a one-to-one relationship with individual nodes in said scene graph;

wherein a change to one of said nodes of said scene graph is transmitted over a link to a corresponding one of said nodes of said presenter graph.

20. A memory as in claim 19, wherein each of said nodes of said scene graph is linked to at least one of said nodes of said presenter graph.

21. A memory as in claim 19, wherein processing said presenter graph said first time is performed such that nodes for those of said objects that do not need to be updated are not included in said list, thereby reducing an amount of processing said presenter graph said second time.

22. A memory as in claim 19, wherein processing said presenter graph said first time and processing said presenter graph said second time are performed depth first.

23. A memory as in claim 19, wherein said media_stream includes at least one of the following: MPEG-1, MPEG-2, H.261, H.263, or MPEG-4.

24. A memory as in claim 19, wherein said scene graph, said presenter graph, or both said scene graph and said presenter graph include values associated with at least one of the following aspects of said objects: size, color, position, angular position, texture, transparency and shape.

25. A memory as in claim 24, wherein said aspects are used to animate said object.

26. A memory as in claim 19, wherein said presenter graph includes information about rendering changes in values associated with at least one of the following aspects of said object: size, color, position, rotation, texture, transparency, and shape.

27. A memory as in claim 19, wherein said changes are responsive to interaction of said user with said objects.

* * * * *